United States Patent [19]

Kobayashi

[11] Patent Number: 5,162,022

[45] Date of Patent: Nov. 10, 1992

[54] MULTIPLE SPROCKET ASSEMBLY FOR BICYCLE

[75] Inventor: Jun Kobayashi, Osaka, Japan

[73] Assignee: Maeda Industries, Ltd., Osaka, Japan

[21] Appl. No.: 759,906

[22] Filed: Sep. 13, 1991

[30] Foreign Application Priority Data

Sep. 18, 1990 [JP] Japan ................................ 2-249773
Sep. 20, 1990 [JP] Japan ................................ 2-253738

[51] Int. Cl.$^5$ .......................................... F16H 9/00
[52] U.S. Cl. ..................................... 474/155; 474/160
[58] Field of Search ............................ 474/77–81, 474/152, 155, 160, 164

[56] References Cited

U.S. PATENT DOCUMENTS

| | | | |
|---|---|---|---|
| 4,268,259 | 5/1981 | Segawa et al. | 474/160 |
| 4,889,521 | 12/1989 | Nagano | 474/164 |
| 5,073,151 | 12/1991 | Nagano | 474/160 |
| 5,085,621 | 2/1992 | Nagano | 474/160 |
| 5,087,226 | 2/1992 | Nagano | 474/160 |

FOREIGN PATENT DOCUMENTS

| | | |
|---|---|---|
| 0021839 | 1/1981 | European Pat. Off. . |
| 0313345 | 4/1989 | European Pat. Off. . |
| 2532710 | 8/1983 | France . |
| 2638702 | 11/1989 | France . |
| 64-40791 | 10/1989 | Japan . |
| 2-127185 | 5/1990 | Japan . |

*Primary Examiner*—Thuy M. Bui
*Attorney, Agent, or Firm*—Marks & Murase

[57] ABSTRACT

A bicycle multiple sprocket assembly comprises at least two adjacent sprockets which include a larger sprocket and a smaller sprocket. A chain takes a shifting path extending from a selected furrow of the smaller sprocket toward a selected furrow of the larger sprocket at the time of shifting from the smaller sprocket to the larger sprocket. At least two teeth of the larger sprocket immediately following the selected furrow of the larger sprocket with respect to the forward rotational direction of the sprocket assembly are rendered circumferentially asymmetric. The leading edge of each asymmetric tooth is provided with a support face which is offset rearwardly for supporting the shifting chain adjacent a chain link connection.

7 Claims, 5 Drawing Sheets

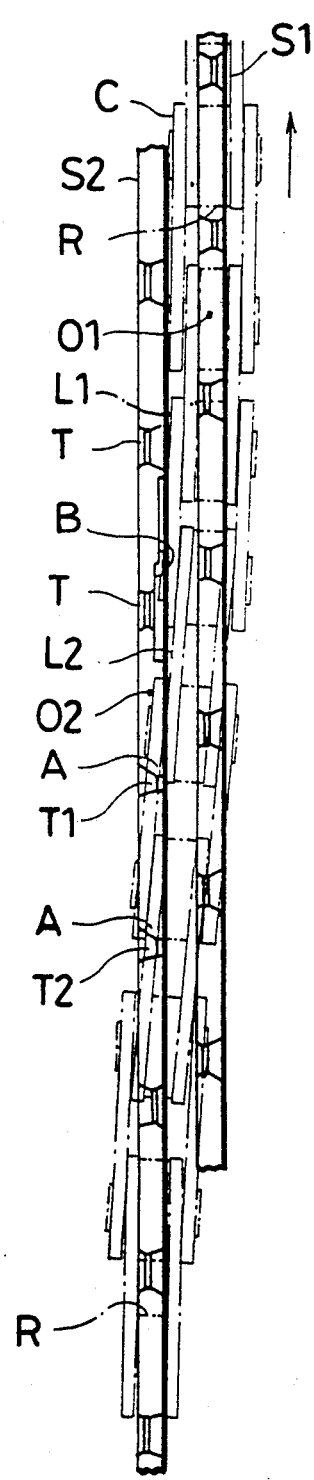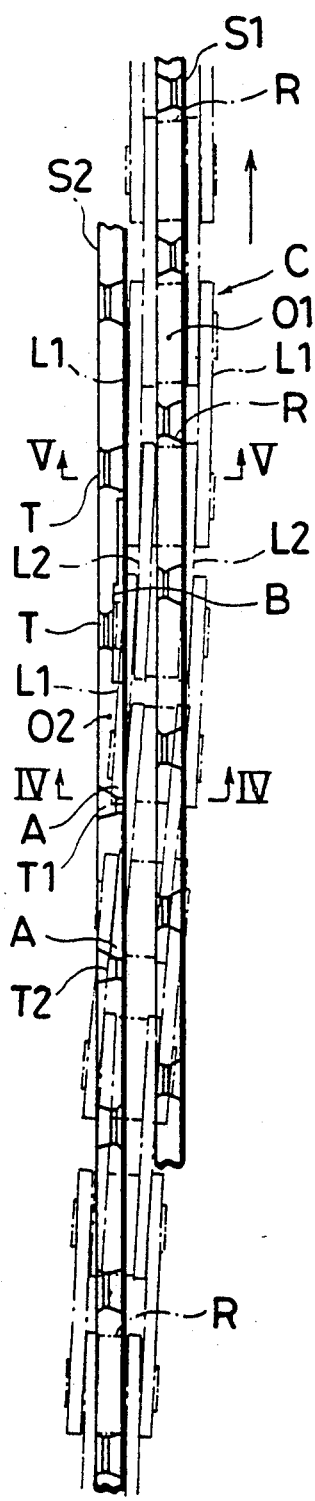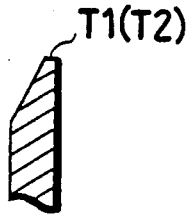

MULTIPLE SPROCKET ASSEMBLY FOR BICYCLE

BACKGROUND OF THE INVENTION

1. Field of the Invention

This invention relates to a bicycle multiple sprocket assembly having at least two diametrically different sprockets. More specifically, the invention relates to a multiple sprocket assembly which is designed to provide smooth chain shifting from a smaller sprocket to a larger sprocket.

The term "multiple sprocket assembly" as used herein includes a multiple chainwheel (front gear) which is mounted on a pedal crank assembly, and a multiple freewheel (rear gear) mounted on a rear wheel hub.

2. Description of the Prior Art

Many of currently available bicycles not only have a multiple freewheel to constitute a rear gear mounted on a rear wheel hub, but also incorporate a multiple chainwheel to constitute a front gear mounted on a pedal crank, thereby increasing the number of selectable speeds. A selected sprocket of the front gear is connected to a selected sprocket of the rear gear by an endless chain, and the pedalling force applied to the front gear is transmitted through the chain to the rear gear for driving the bicycle forward.

With a multiple sprocket assembly, a speed change is performed by causing a derailleur (front derailleur or rear derailleur) to laterally press a portion of the chain entering to the sprocket assembly in rotation, which results in that the chain is laterally inclined for shifting from a smaller sprocket to a larger sprocket or vice versa. Obviously, the speed change performance of the sprocket assembly is determined by the smoothness and promptness in disengaging the chain from a presently engaging sprocket for engagement with a target sprocket.

In shifting the chain from a larger sprocket to a smaller sprocket, the chain need only be disengaged from the larger sprocket because a tension applied to the chain by the return spring of the rear derailleur can be utilized for causing the chain to automatically fall into engagement with the smaller sprocket. In shifting the chain from the smaller sprocket to the larger sprocket, on the other hand, mere disengagement of the chain from the smaller sprocket is not sufficient because the chain must be radially lifted against the chain tension with an additional energy to a height suitable for engagement with the larger sprocket. Thus, it has been proven more difficult to shift the chain from the smaller sprocket to the larger sprocket than shifting it from the larger sprocket to the smaller sprocket. Particularly, difficulty arises when the diametrical difference between the two sprockets is small because, in this case, the chain must incline laterally with a large angle (i.e., with a large stress) in a relatively short chain shifting path.

Various attempts have been made to improve chain shiftability from a smaller sprocket to a larger sprocket. However, none of the past attempts have produced satisfactorily successful results as yet.

SUMMARY OF THE INVENTION

It is, therefore, an object of the present invention is to provide a bicycle multiple sprocket assembly which provides smooth chain shifting from a smaller sprocket to a larger sprocket without causing excessive lateral inclination or bending of the shifting chain.

Another object of the present invention is to provide a bicycle multiple sprocket assembly which facilitates chain shifting from a smaller sprocket to a larger sprocket even if the diametrical difference between the two sprockets is relatively small.

According to the present invention, there is provided a bicycle multiple sprocket assembly comprising at least two adjacent sprockets which include a diametrically larger sprocket and a diametrically smaller sprocket, each sprocket having teeth alternate with furrows, each tooth having an apex, said each tooth further having a leading edge and a trailing edge with respect to a forward rotational direction of the sprocket assembly, wherein a chain takes a shifting path extending from a selected furrow of the smaller sprocket toward a selected furrow of the larger sprocket at the time of shifting from the smaller sprocket to the larger sprocket, and wherein at least two teeth of the larger sprocket immediately following said selected furrow of the larger sprocket with respect to said forward rotational direction are rendered circumferentially asymmetric, the leading edge of each asymmetric tooth being provided with a support face which is offset rearwardly for supporting the shifting chain adjacent a chain link connection, a side surface of the larger sprocket located closer to the smaller sprocket being formed with a cutout for reducing interference between the larger sprocket and the chain moving along the shifting path.

The support face of each asymmetric tooth may be formed by chamfering its apex toward its leading edge. Alternatively, the leading edge of the asymmetric tooth may be rendered offset rearwardly as a whole.

Preferably, each asymmetric tooth should be also offset laterally toward the smaller sprocket. In this case, the asymmetric tooth works as an easily engaging tooth to insure that the chain takes the shifting path extending from the selected furrow of the smaller sprocket toward the selected furrow of the larger sprocket. Further, for the same purpose, at least two teeth of the larger sprocket immediately preceding the selected furrow of the larger sprocket with respect to the forward rotational direction of the sprocket assembly may be offset laterally away from the smaller sprocket to serve as relunctantly engaging teeth When the diametrical difference between the smaller and larger sprockets is relatively large, the chain shifting path may become straight because the relatively large diametrical difference allows the shifting path to have an enough length for lateral inclination or bending of the shifting chain without much stress.

On the other hand, when the diametrical difference between the smaller and larger sprockets is relatively small, the smaller sprocket may be preferably made to have a chain bending tooth which follows another tooth of the smaller sprocket located immediately behind the selected furrow of the smaller sprocket. The chain bending tooth has a guiding face which supports and bends the chain in shifting to the larger sprocket.

Other objects, features and advantages of the present invention will be clearly understood from the following description of the preferred embodiments given with reference to the accompanying drawings.

BRIEF DESCRIPTION OF THE DRAWINGS

In the accompanying drawings:

FIGS. 2 and 3 are views of the same sprocket assembly in two different chain shifting conditions as seen in the direction of an arrow II in FIG. 1;

FIG. 4 is a sectional view taken on lines IV—IV in FIG. 2;

FIG. 5 is a sectional view taken on lines V—V in FIG. 2;

DETAILED DESCRIPTION OF THE PREFERRED EMBODIMENTS

Figure 1:
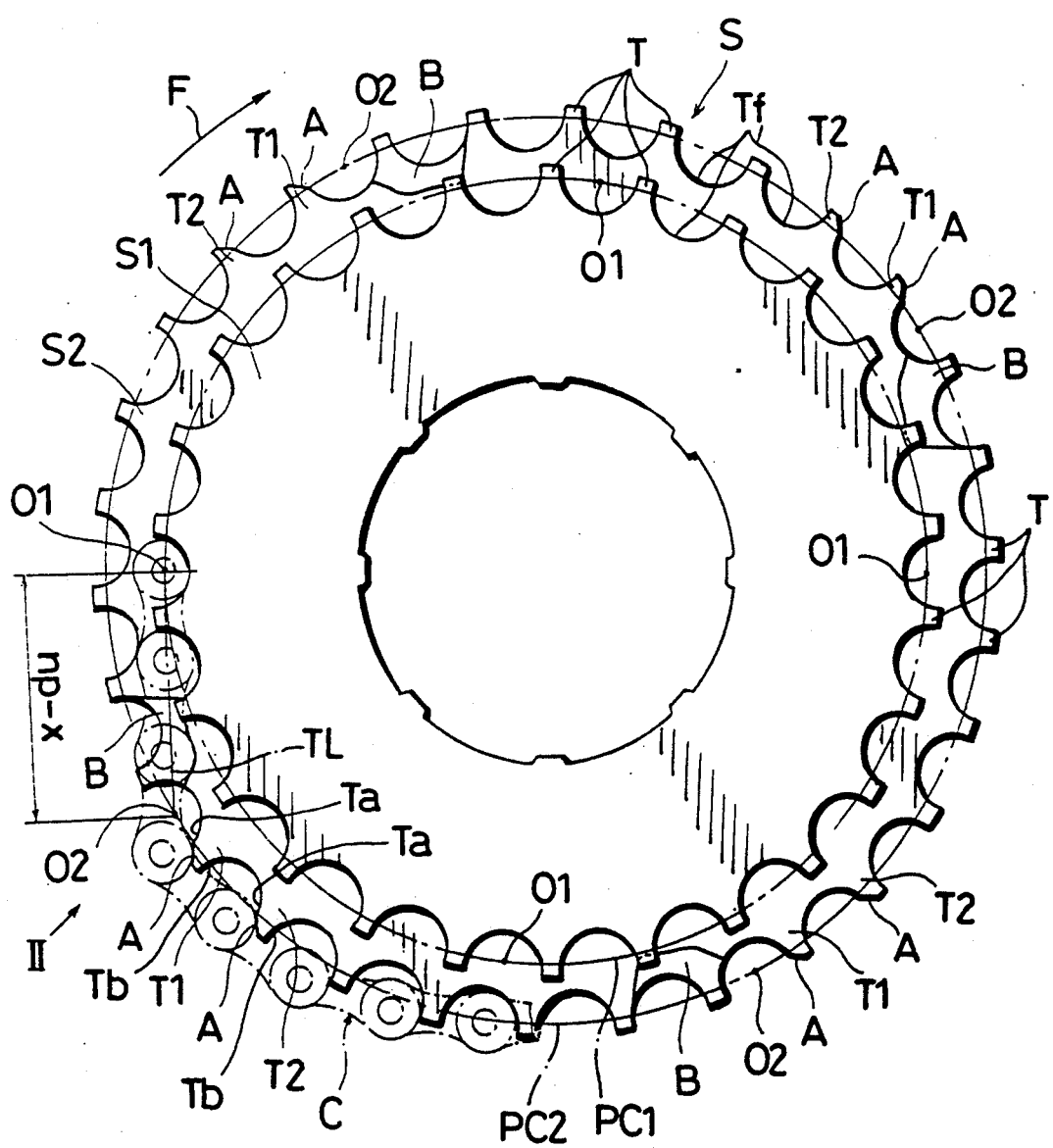
FIG. 1 is a side view showing a multiple sprocket assembly embodying the present invention.

Throughout the accompanying drawings, like parts are designated by the same reference numerals and characters.

FIGS. 1 through 5 show a first embodiment of the present invention which is applied to a multiple freewheel (rear gear). However, the present invention is equally applicable to a multiple chainwheel (front gear).

For simplicity of illustration, the multiple freewheel S is shown in FIG. 1 to include a diametrically larger sprocket S1, and a diametrically smaller sprocket S2 arranged laterally of the larger sprocket adjacent thereto. In reality, however, the freewheel of the illustrated embodiment includes a larger number (usually 5 to 8) of diametrically different sprockets, and the present invention is applicable to any two adjacent sprockets of the assembly.

The circumferential portion of each sprocket S1, S2 is formed with teeth T (including specific teeth T1, T2 to be described later) arranged at constant pitch which corresponds to the pitch of a chain C. Each sprocket tooth T has a leading edge Ta and a trailing edge Tb with respect to a forward rotational direction indicated by an arrow F in FIG. 1. Generally arcuate furrows Tf are formed between the respective teeth. Indicated by PC1 and PC2 are pitch circles of the respective sprockets.

As shown in FIGS. 2 and 3, the chain C includes pairs of outer links L1 and pairs of inner links L2 alternate with the outer link pairs. The inner link pairs L2 are connected to the outer link pairs L1 by roller pins R. The rollers R are slightly smaller in curvature than the sprocket furrows Tf. Thus, each sprocket S1, S2 engages with the chain C in a manner such that each chain roller R is received in a furrow Tf between two adjacent sprocket teeth T. Obviously, there is a slight backlash or play between the chain roller R and the sprocket furrow Tf due to the above-mentioned difference in curvature.

Now, a tangential line TL is drawn relative to the smaller sprocket pitch circle PC1 to extend from a particular furrow center 01 of the smaller sprocket S1, as shown in FIG. 1. According to the present invention, the relative angular position of the smaller and larger sprockets S1, S2 is selected so that the tangential line TL intersects the larger sprocket pitch circle PC2 at a particular furrow center O2 of the larger sprocket S2 with a length of np-x.

In np-x, np represents the chain pitch p multiplied by an integer number n, whereas x represents a value which is larger than the backlash between the chain roller R and the sprocket furrow Tf but smaller than the chain pitch p. Thus, when the chain C extends from the particular furrow center 01 of the smaller sprocket S1 for shifting to the larger sprocket S2, the chain roller R closest to the particular furrow center O2 of the larger sprocket S2 cannot immediately fit into the corresponding tooth furrow Tf.

In the embodiment illustrated in FIG. 1, the above-mentioned relation is satisfied at four portions of the sprocket assembly S. Note that there are four O1 and four O2 in FIG. 1. However, for simplicity of explanation, the following description will be made only with respect to one of such portions.

According to the present invention, the tooth T1 (hereafter referred to as "first tooth") immediately following the particular furrow center O2 of the larger sprocket S2 with respect to the forward rotational direction F has a leading edge Ta which is formed with a rearwardly offset support face A located radially inwardly of the tooth apex for supporting the chain C near the corresponding roller R. Similarly, the tooth T2 (hereafter referred to as "second tooth") immediately following the first tooth T1 has a leading edge Ta which is formed with a rearwardly offset support face A located radially inwardly of the tooth apex for supporting the chain near the corresponding roller R. The offset support face A may be formed by partially chamfering the tooth apex toward the leading edge Ta.

Due to the provision of the offset or chamfered support faces A, the first and second teeth T1, T2 of the larger sprocket S2 are circumferentially asymmetric. However, the trailing edges Tb of the first and second teeth T1, T2 remain substantially identical to those of the other teeth T.

Further, according to the present invention, the side surface (inner side surface) of the larger sprocket S2 closer to the smaller sprocket S1 is formed with a cutout B. This cutout is arranged rotationally ahead of the particular furrow center O2 of the larger sprocket S2 so that the chain C extending tangentially from the particular furrow center O1 of the smaller sprocket S1 does not interfere with the larger sprocket at the time of shifting to the larger sprocket, as better shown in FIGS. 2 and 3.

As understood by those skilled in the art, if no measure is taken, the chain C may start disengaging from any circumferential position of the smaller sprocket S1 when shifting to the larger sprocket S2. According to the illustrated embodiment, the following measure is adopted to insure that the chain C takes a specific path when shifting from the smaller sprocket S1 to the larger sprocket S2.

Specifically, as shown in FIGS. 2-4, the first and second teeth T1, T2 of the larger sprocket S2 are made to have their respective apexes offset laterally toward the smaller sprocket S1 to provide easier engagement with the chain C disengaging from the smaller sprocket S1. On the other hand, as shown in FIGS. 2, 3 and 5, at least two teeth T of the larger sprocket S2 immediately preceding the particular furrow center O2 are made to have their apexes offset laterally away from the smaller sprocket S1 to provide more reluctant engagement with the chain C disengaging from the smaller sprocket. Thus, when shifting from the smaller sprocket S1 to the larger sprocket S2, the chain C is most likely take a path extending from the particular furrow center O1 of the smaller sprocket S1 toward the particular furrow center O2 of the larger sprocket S2.

With the multiple sprocket assembly S described above, the chain C is shifted from the smaller sprocket S1 to the larger sprocket S2 in the following manner.

It is now assumed that the sprocket assembly S rotates in the arrow F direction (clockwise). Before shifting, the chain C engages with the smaller sprocket S1 substantially around a rear half thereof. The chain enters into engagement with the smaller sprocket from an unillustrated rear derailleur located below the sprocket assembly and leaves the smaller sprocket from a top position thereof to extend generally horizontally into engagement with an unillustrated chainwheel (front gear).

For shifting the chain C onto the larger sprocket S2, the unillustrated rear derailleur is displaced laterally to push the chain toward the larger sprocket, so that the chain is laterally inclined toward the larger sprocket. As previously described, the first and second teeth T1, T2 located rotationally behind the particular furrow center O2 of the larger sprocket provide easier engagement with the chain, whereas the teeth T rotationally preceding the particular furrow center O2 provide reluctant engagement with the chain. Further, the cutout B arranged rotationally ahead of the particular furrow center O2 prevents interfering contact between the chain and the larger sprocket. Thus, the chain C takes a path extending from the particular furrow center O1 of the smaller sprocket S1 toward the particular furrow center O2 of the larger sprocket S2 generally along the tangential line TL at the time of shifting to the larger sprocket.

As previously described, the outer link pairs L1 of the chain C are alternate with the inner link pairs L2. Thus, at the time of chain shifting from the smaller sprocket S1 to the larger sprocket S2, two conditions are possible which include the FIG. 2 condition wherein the first tooth T1 of the larger sprocket S2 meets the chain C outside an inner link pair L2, and the FIG. 3 condition wherein the first tooth T1 meets the chain inside an outer link pair L1. In either case, the chain is stably supported by the offset support face A of the first tooth T1 near a particular roller pin R.

Upon further rotation of the sprocket assembly S, a portion of the chain C following the first tooth T1 is overlapped onto the larger sprocket S2 due to the lateral pressing force imparted by the unillustrated derailleur. As a result, the sprocket teeth (including the second teeth T2) following the first tooth T1 are caught between the chain link pairs L1, L2. Obviously, chain shifting to the larger sprocket S2 is completed when the sprocket assembly S is rotated to a point where the chain is fully disengaged from the smaller sprocket S1. It should be appreciated that a fourth chain roller R following the first tooth T1 of the larger sprocket is fully fitted in a tooth furrow Tf of the larger sprocket according to the illustrated embodiment, as shown in FIG. 1.

According to the present invention, the tangential line TL extending from the particular furrow center O1 of the smaller sprocket S1 to the particular furrow center O2 of the larger sprocket S2 has a length of np-x. This dimensional setting prevents a chain roller R from being immediately caught at the particular furrow center O2 of the larger sprocket. Obviously, if the chain roller R is immediately caught at the furrow center O2 (that is; the length of the tangential line TL is np), the chain must be laterally inclined to a greater degree than illustrated in FIGS. 2 and 3. Thus, the dimensional setting of the present invention is significant in reducing the lateral inclination angle of the chain at the time of shifting from the smaller sprocket to the larger sprocket.

The cutout B prevents the larger sprocket S2 from interfering with the chain C extending along the tangential line TL. Such interference prevention is also significant in reducing the inclination angle of the shifting chain in addition to enabling smooth shifting movement of the chain. It should be appreciated that the cutout B need not be deep, so that the provision of such a cutout does not result in unacceptable strength reduction of the larger sprocket teeth.

The first and second teeth T1, T2 of the larger sprocket S2 are laterally offset toward the smaller sprocket S1 (see FIG. 4) to ensure that the chain C takes the specific tangential path TL when shifting to the larger sprocket, as already described. In fact, the thus offset teeth have an additional function of reducing the lateral inclination angle of the shifting chain because the chain engaging these two teeth can be also offset slightly toward the smaller sprocket at the time of shifting to the larger sprocket.

The offset support faces A of the first and second teeth T1, T2 of the larger sprocket S2 are technically significant for the following reasons.

Because of the length np-x for the tangential chain shifting path TL, a chain roller R cannot fit in the particular furrow center O2 of the larger sprocket, and the chain C cannot immediately engage the larger sprocket S2 (this being important for reducing the inclination angle of the shifting chain). Instead, the chain C rides on the first and second teeth T1, T2. If the first and second teeth have no offset face A, the non-chamfered apexes of these teeth tend to excessively lift the chain to a greater degree than illustrated in FIG. 1. Such excessive chain lifting is undesirable because a greater energy is required to lift the chain to a greater degree against the counteracting force of the derailleur return spring (not shown), and because the chain, if lifted higher, is more reluctant to engage with the larger sprocket (i.e., easier to disengage from the larger sprocket).

As shown in FIG. 1, the offset or chamfered faces A of the first and second teeth T1, T2 support the chain C which has been lifted moderately to a level lower than the apexes of these teeth. Thus, the energy required for lifting the chain against the couteracting spring force is correspondingly reduced. Further, such moderate chain lifting results in that the chain reaches a nearly engaging state (but not a fully engaging state) at an earlier stage of chain shifting.

In summary, according to the present invention, it is possible to reduce the lateral inclination angle of the chain C shifting from the smaller sprocket S1 to the larger sprocket S2, thereby enabling smooth chain shifting. Further, because of the reduced lateral inclination angle, even if a large tension (due to a large pedalling force) is applied to the shifting portion (along the tangential line TL) of the chain, the chain will be unlikely to be damaged or broken at the shifting portion.

Figure 6:
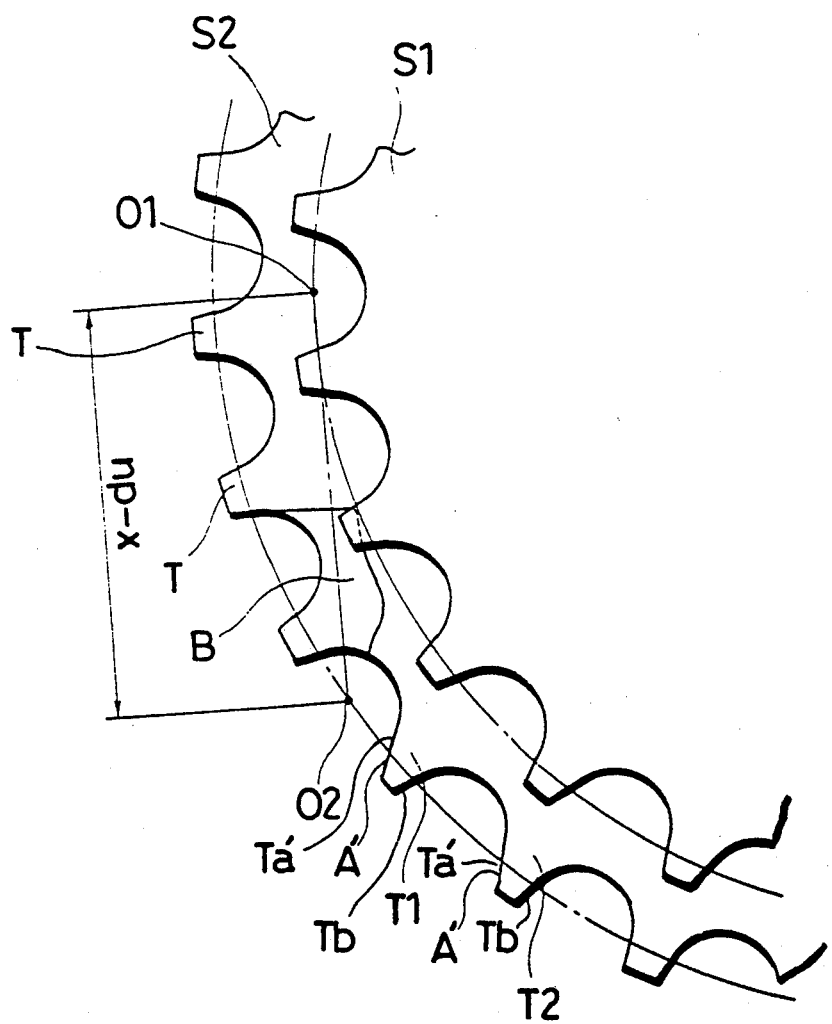
FIG. 6 is an enlarged fragmentary side view showing a modified multiple sprocket assembly according to the present invention.

Instead of chamfering the first and second teeth T1, T2 for the provision of the offset support faces A, each of these teeth may be made to have a leading edge Ta' which is rotationally offset rearwardly as a whole, as shown in FIG. 6. In this case, a portion of the leading edge Ta' adjacent to the tooth apex acts as a support face A'.

Figure 7:
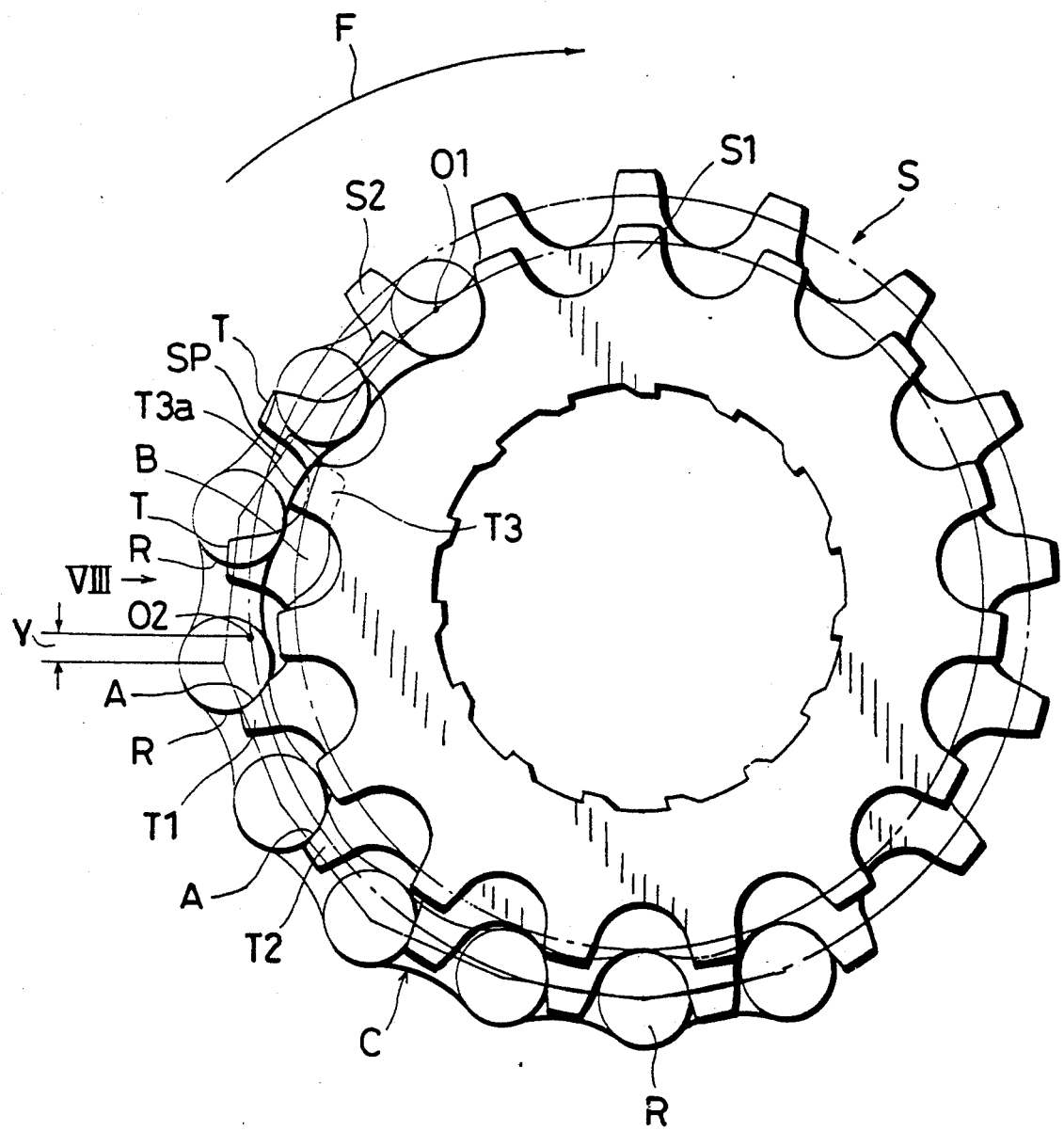
FIG. 7 is a side view showing another multiple sprocket assembly embodying the present invention.
Figure 8:
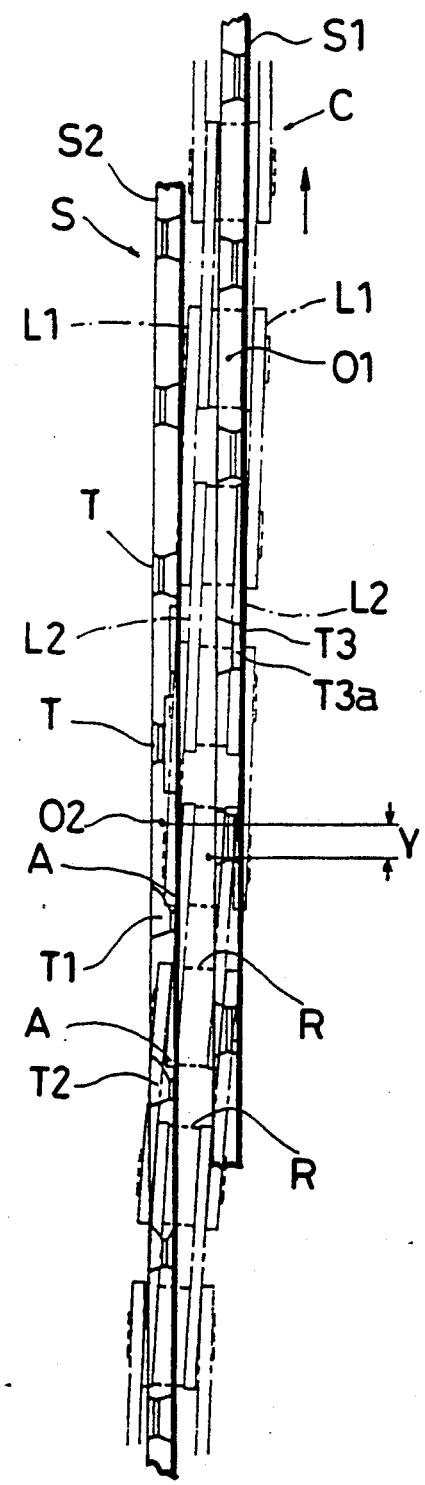
FIG. 8 is a view of the same sprocket assembly as seen in the direction of an arrow VIII in FIG. 7.

FIGS. 7 and 8 show a second embodiment which is advantageously applicable when the diametrical difference between two adjacent sprockets is relatively small.

A multiple sprocket assembly S according to the second embodiment includes a diametrically smaller sprocket S1 and a diametrically larger sprocket S2, but the diametrical difference between these two sprockets is relatively small. As clearly understood from FIGS. 7 and 8, the larger sprocket S2 of the second embodiment is substantially identical to that of the first embodiment except for minor dimensional differences. Thus, the specific configuration of the larger sprocket is not described here to avoid duplicated explanation.

The chain C engaging with the smaller sprocket S1 starts disengaging therefrom at a particular furrow center O1 and takes a shifting path SP toward a particular furrow center O2 of the larger sprocket S2. However, the chain shifting path SP is bent instead of straight.

To cause bending of the chain shifting path SP, a particular tooth T3 (hereafter referred to as "chain bending tooth") of the smaller sprocket S1 is made to have an guiding face T3a. The chain bending tooth T3 is a second tooth following the particular furrow center O1 of the smaller sprocket and located between the two particular furrow centers O1, O2.

At the time of shifting the chain C from the smaller sprocket S1 to the larger sprocket S2, a chain link L2 (or L1) of the chain rides on the guiding face T3a of the chain bending tooth T3 and is lifted thereby. To facilitate lifting of the chain link, the guiding face T3a may be made to have a shape coinciding with the radially inner marginal edge of the lifted link. However, the guiding face T3a may be otherwise shaped as long as the chain link is conveniently lifted up and supported.

The chain thus guided by the chain bending tooth T3 takes the bent shifting path SP and is then supported by the first tooth T1 of the larger sprocket S2 near the corresponding roller pin R, as shown in FIG. 7. In this condition, the center of the corresponding roller pin R deviates rotationally rearward from the particular furrow center O2 of the larger sprocket by an amount Y which is larger than half the roller-furrow backlash but smaller than the chain pitch.

According to the second embodiment, the chain C takes the bent shifting bath SP when shifting from the smaller sprocket S1 to the larger sprocket S2. Obviously, the bent shifting path is longer than a straight shifting path, and the chain can deform laterally (i.e., incline laterally) in such an elongated path for shifting to the larger sprocket. Thus, the stress or strain produced in the shifting portion of the chain is correspondingly reduced to enable smooth chain shifting. This feature is particularly advantageous when the diametrical difference between the two sprockets S1, S2 is relatively small to provide the tendency of shortening the chain shifting path.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. A bicycle multiple sprocket assembly comprising at least two adjacent sprockets which include a diametrically larger sprocket and a diametrically smaller sprocket, each sprocket having teeth alternate with furrows, each tooth having an apex, said each tooth further having a leading edge and a trailing edge with respect to a forward rotational direction of the sprocket assembly, wherein a chain takes a shifting path extending from a selected furrow of the smaller sprocket toward a selected furrow of the larger sprocket at the time of shifting from the smaller sprocket to the larger sprocket, and wherein at least two teeth of the larger sprocket immediately following said selected furrow of the larger sprocket with respect to said forward rotational direction are rendered circumferentially asymmetric, the leading edge of each asymmetric tooth being provided with a support face which is offset rearwardly for supporting the shifting chain adjacent a chain link connection, a side surface of the larger sprocket located closer to the smaller sprocket being formed with a cutout for reducing interference between the larger sprocket and the chain moving along the shifting path.

2. The sprocket assembly according to claim 1, wherein the support face of said each asymmetric tooth is formed by chamfering its apex toward its leading edge.

3. The sprocket assembly according to claim 1, wherein the leading edge of said each asymmetric tooth is offset rearwardly as a whole.

4. The sprocket assembly according to claim 1, wherein said each asymmetric tooth is also offset laterally toward the smaller sprocket.

5. The sprocket assembly according to claim 4, wherein at least two teeth of the larger sprocket immediately preceding said selected furrow of the larger sprocket with respect to said rotational direction are offset laterally away from the smaller sprocket.

6. The sprocket assembly according to claim 1, wherein the diametrical difference between the smaller and larger sprockets is such that the chain shifting path becomes straight.

7. The sprocket assembly according to claim 1, wherein the diametrical difference between the smaller and larger sprockets is such that the chain shifting path interferes with a chain bending tooth of the smaller sprocket which follows another tooth of the smaller sprocket located immediately behind said selected furrow of the smaller sprocket, the chain bending tooth having a guiding face which supports and bends the chain in shifting to the larger sprocket.

* * * * *